United States Patent
Al-Enazi et al.

(10) Patent No.: US 11,311,838 B2
(45) Date of Patent: Apr. 26, 2022

(54) GLYCOL DEHYDRATION AND REGENERATION

(71) Applicant: Saudi Arabian Oil Company, Dhahran (SA)

(72) Inventors: Faisal Atollah Al-Enazi, Dammam (SA); Maher Uraijah, Shaybah (SA)

(73) Assignee: Saudi Arabian Oil Company, Dhahran (SA)

( * ) Notice: Subject to any disclaimer, the term of this patent is extended or adjusted under 35 U.S.C. 154(b) by 265 days.

(21) Appl. No.: 16/458,860

(22) Filed: Jul. 1, 2019

(65) Prior Publication Data
US 2021/0001268 A1    Jan. 7, 2021

(51) Int. Cl.
*B01D 53/14* (2006.01)
*B01D 53/26* (2006.01)
*B01D 53/18* (2006.01)

(52) U.S. Cl.
CPC ....... *B01D 53/263* (2013.01); *B01D 53/1425* (2013.01); *B01D 53/1493* (2013.01); *B01D 53/18* (2013.01); *B01D 2252/2026* (2013.01); *B01D 2252/504* (2013.01)

(58) Field of Classification Search
CPC ...... B01D 2252/2026; B01D 2252/504; B01D 53/1425; B01D 53/1493; B01D 53/18; B01D 53/263; B01D 53/28
See application file for complete search history.

(56) References Cited

U.S. PATENT DOCUMENTS

| 2,464,368 | A | 3/1949 | Barnes |
| 4,005,997 | A | 2/1977 | Fowler et al. |
| 4,332,643 | A | 6/1982 | Reid |
| 5,490,873 | A | 2/1996 | Behrens et al. |

FOREIGN PATENT DOCUMENTS

EP    1019169    7/2000

OTHER PUBLICATIONS

Baktash et al., "Improvement of TEG regeneration in natural gas dehydration using a hydrocarbon solvent", Sep. 2010 (Year: 2010).*
Khan et al., "Optimizing effective absorption during wet natural gas dehydration by Tri Ethylene Glycol," Journal of Applied Chemistry, Jan. 2012, 2(2):1-6.

(Continued)

*Primary Examiner* — Cabrena Holecek
(74) *Attorney, Agent, or Firm* — Fish & Richardson P.C.

(57) ABSTRACT

Within a glycol contactor, a glycol stream is contacted with a wet gas stream including water in order to transfer at least a portion of the water from the wet gas stream to the glycol stream. The glycol stream entering the glycol contactor includes a mixture of triethylene glycol and tetraethylene glycol. The glycol stream exiting the glycol contactor includes the portion of the water from the wet gas stream. The glycol stream exiting the glycol contactor is flowed to a glycol regeneration system. By the glycol regeneration system and using a solvent including iso-octane, the glycol stream is fractionated to remove the portion of the water from the glycol stream. The fractionated glycol stream is recycled to the glycol contactor.

4 Claims, 9 Drawing Sheets

(56) References Cited

OTHER PUBLICATIONS

Smulski et al., "The dependency on the temperature of efficiency of the regeneration process in glycols," AGH Drilling, Oil, Gas, Jan. 2016, 33(4):733-746.
PCT International Search Report and Written Opinion in International Appln. No. PCT/US2020/040139, dated Oct. 8, 2020, 21 pages.
Baktash et al., "Improvement of TEG regeneration in natural gas dehydration using a hydrocarbon solvent," Sep. 2010, 7 pages.
digitalrefining.com [online], "Operational feedback from the Nkossa Drizo gas dehydration unit offshore Congo," Chambon et al., Mar. 2017, 2 pages.
Paymooni et al., "Enhancement in TEG Purity via Hydrocarbon Solvent Injection to a TEG + Water System in a Batch Distillation Column," energy and fuels, ACS Publication 2011 American Chemical Society, Oct. 2011, 12 pages.
GCC Examination Report in GCC Appln. No. GC 2020-40009, dated Aug. 26, 2021, 4 pages.

* cited by examiner

GLYCOL DEHYDRATION AND REGENERATION

TECHNICAL FIELD

This disclosure relates to glycol regeneration in relation to gas dehydration.

BACKGROUND

When produced from a reservoir, natural gas usually contains some water and is typically completely saturated or at the water dew point. This water can cause problems for downstream processes and equipment. For example, the water can either freeze in piping or form hydrates with carbon dioxide and hydrocarbons (such as methane hydrates). Gas dehydration units depress the hydrate formation point of the gas through water removal. One example of a gas dehydration unit is a glycol dehydration unit, in which glycols are used to dehydrate the gas. Without dehydration, a free water phase (liquid water) could also drop out of the natural gas as it is either cooled or the pressure is lowered through equipment and piping. This free water phase often contains some portions of acid gas (such as hydrogen sulfide and carbon dioxide) and can cause corrosion.

SUMMARY

This disclosure describes technologies relating to glycol regeneration in relation to gas dehydration. The subject matter described in this disclosure can be implemented in particular implementations, so as to realize one or more of the following advantages over traditional glycol dehydration processes. Glycol losses (for example, by escaping with the dehydrated gas) can be reduced. Purity of the regenerated glycol can be increased. Emissions of toxic compounds (such as sulfur dioxide) can be reduced. The amount of gas sent to the flare from the glycol dehydration process can be reduced. Operating costs associated with the glycol dehydration process can be reduced.

Certain aspects of the subject matter described can be implemented as a method. By a glycol contactor, a glycol stream is contacted with a wet gas stream including water to transfer at least a portion of the water from the wet gas stream to the glycol stream. The glycol stream entering the glycol contactor includes a mixture of triethyelen glycol and tetraethylene glycol. The glycol stream exiting the glycol contactor includes the portion of the water from the wet gas stream. The glycol stream exiting the glycol contactor is flowed to a glycol regeneration system. By the glycol regeneration system and using a solvent including iso-octane, the glycol stream is fractionated to remove the portion of the water from the glycol stream. The fractionated glycol stream is recycled to the glycol contactor.

This, and other aspects, can include one or more of the following features.

The glycol stream including the water from the wet gas stream can be received as feed at a first stripping column section of the glycol regeneration system. A first overhead stream including the iso-octane and the water can be discharged from the first stripping column section. A first bottoms stream can be discharged from the first stripping column section. The first bottoms stream can be received as feed at a second stripping column section of the glycol regeneration system. A second overhead stream can be discharged from the second stripping column section. A second bottoms stream including the triethylene glycol and tetraethylene glycol can be discharged from the second stripping column section. The second overhead stream can be received at the first stripping column section. A first portion of the iso-octane of the first overhead stream can be recycled to the first stripping column section. A second portion of the iso-octane of the first overhead stream can be recycled to the second stripping column section.

The mixture of triethylene glycol and tetraethylene glycol can include from approximately 10 weight percent (wt. %) to approximately 30 wt. % of tetraethylene glycol.

The mixture of triethylene glycol and tetraethylene glycol can include approximately 20 wt. % of tetraethylene glycol.

The second bottoms stream can be the fractionated glycol stream recycled to the glycol contactor.

The second bottoms stream can include less than 0.1 wt. % of iso-octane.

The iso-octane and the water of the first overhead stream can be separated before recycling the first and second portions of the iso-octane.

A mass ratio of the first portion to the second portion can be in a range of from approximately 1:5 to approximately 1:10.

Certain aspects of the subject matter described can be implemented as a method. A stream including one or more glycols and water is received as feed at a first stripping column section. A first overhead stream including iso-octane and the water is discharged from the first stripping column section. A first bottoms stream is discharged from the first stripping column section. The first bottoms stream is received as feed at a second stripping column section. A second overhead stream is discharged from the second stripping column section. A second bottoms stream including the one or more glycols is discharged from the second stripping column section. The second overhead stream is received at the first stripping column section. A first portion of the iso-octane of the first overhead stream is recycled to the first stripping column section. A second portion of the iso-octane of the first overhead stream is recycled to the second stripping column section.

This, and other aspects, can include one or more of the following features.

The stream can include a mixture of triethylene glycol and tetraethylene glycol.

The mixture of triethylene glycol and tetraethylene glycol can include from approximately 10 wt. % to approximately 30 wt. % of tetraethylene glycol.

The mixture of triethylene glycol and tetraethylene glycol can include approximately 20 wt. % of tetraethylene glycol.

The second bottoms stream can include less than 0.1 wt. % of iso-octane.

The iso-octane and the water of the first overhead stream can be separated before recycling the first and second portions of the iso-octane.

A mass ratio of the first portion to the second portion can be in a range of from approximately 1:5 to approximately 1:10.

Certain aspects of the subject matter described can be implemented as a gas dehydration system. The gas dehydration system includes a glycol contactor and a glycol regeneration system. The glycol contactor is configured to receive a wet gas stream including water. The glycol contactor is configured to receive a glycol stream including a mixture of triethylene glycol and tetraethylene glycol. The glycol contactor is configured to dehydrate the wet gas stream by contacting the wet gas stream with the glycol stream. The glycol stream exiting the glycol contactor includes at least a portion of the water from the wet gas stream. The glycol regeneration system is configured to remove the portion of the water from the glycol stream such that the glycol stream can be recycled to the glycol contactor. The glycol regeneration system includes a first stripping column section and a second stripping column section. The first stripping column section is configured to receive the glycol stream including water as feed. The first stripping column is configured to discharge a first overhead stream including iso-octane and the portion of the water. The first stripping column is configured to discharge a first bottoms stream. The second stripping column is configured to receive the first bottoms stream as feed. The second stripping column section is configured to discharge a second overhead stream. The second stripping column section is configured to discharge a second bottoms stream including the glycol stream free of the portion of the water. The first stripping column section is configured to receive the second overhead stream and a first portion of the iso-octane of the first overhead stream. The second stripping column is configured to receive a second portion of the iso-octane of the first overhead stream.

This, and other aspects, can include one or more of the following features.

The mixture of triethylene glycol and tetraethylene glycol can include approximately 10 wt. % to approximately 30 wt. % of tetraethylene glycol.

The mixture of triethylene glycol and tetraethylene glycol can include approximately 20 wt. % of tetraethylene glycol.

The second bottoms stream can include less than 0.1 wt. % of iso-octane.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

In glycol dehydration, wet gas (that is, gas including water) is brought into contact with one or more glycols in an absorber (also referred to as a glycol contactor). The glycol removes water from the gas by physical absorption. The glycol exiting the glycol contactor can be regenerated to remove the water from the glycol, so that the glycol can be recycled and re-used in the glycol contactor. The dehydrated gas (sometimes referred to as dry gas) exiting the glycol contactor can, for example, be flowed to a pipeline or a gas processing plant.

Figure 1:
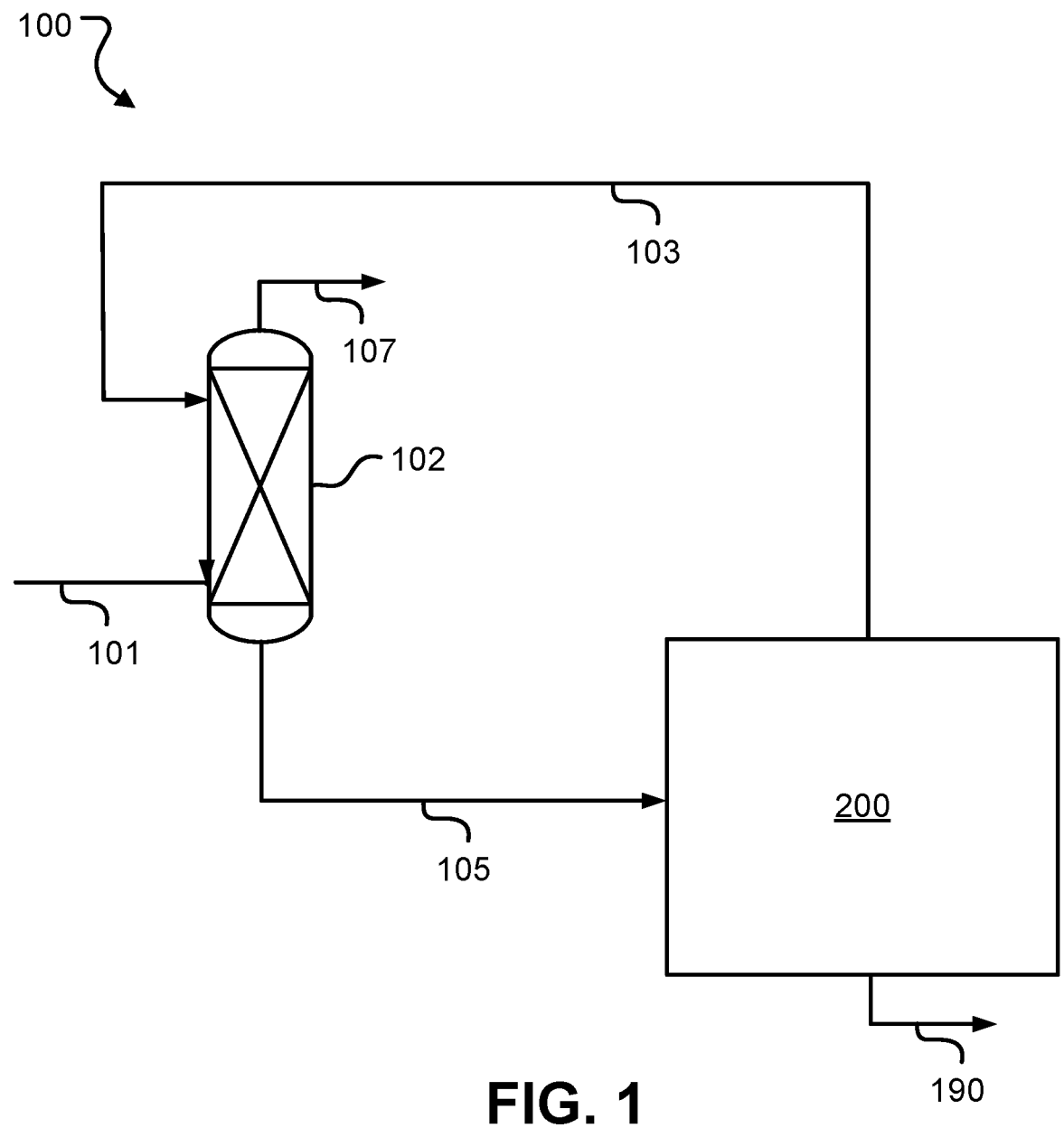
FIG. 1 is a schematic diagram of an example gas dehydration system.

Referring to FIG. 1, a gas dehydration system 100 includes a glycol contactor 102 and a glycol regeneration system 200. The glycol contactor 102 is configured to receive a wet gas stream 101 that includes water. The glycol contactor 102 is configured to receive a glycol stream 103. The glycol stream 103 includes glycol, such as triethylene glycol. Some additional non-limiting examples of a suitable glycol include diethylene glycol, ethylene glycol, and tetraethylene glycol. In some implementations, the glycol stream 103 includes a mixture of glycols. In some implementations, the glycol stream 103 includes approximately 10 weight percent (wt. %) to approximately 30 wt. % of a first glycol and a balance of a second glycol (different from the first glycol). For example, the glycol stream 103 includes approximately 10 wt. % to approximately 30 wt. % of tetraethylene glycol and a balance of triethylene glycol. For example, the glycol stream 103 includes approximately 20 wt. % of tetraethylene glycol and approximately 80 wt. % of triethylene glycol.

The glycol contactor 102 is configured to dehydrate the wet gas stream 101 by contacting the wet gas stream 101 with the glycol stream 103. The glycol stream 105 exiting the glycol contactor 102 can include at least a portion of the water from the wet gas stream 101. The dry gas stream 107 exiting the glycol contactor 102 has a reduced water content in comparison to the wet gas stream 101 entering the glycol contactor 102. Although shown as a single glycol contactor 102 in FIG. 1, the glycol contactor 102 can include multiple glycol contactors (for example, in series or parallel). In some implementations, the glycol contactor 102 includes one or more trays. In some implementations, the glycol contactor 102 includes packing (for example, structured packing, random packing, or both). In some implementations, the glycol contactor 102 includes both trays and packing. In some implementations, the glycol contactor 102 includes at least six trays. In some implementations, the glycol contactor 102 includes at least two feet in height of packing.

The glycol stream 103 entering the glycol contactor 102 can be referred to as the lean glycol stream 103. The lean glycol stream 103 can be substantially free of water. At the very least, the lean glycol stream 103 contains less water than the wet gas stream 101 entering the glycol contactor 102. The glycol stream 105 exiting the glycol contactor 102 can be referred to as the rich glycol stream 105, while the dry gas stream 107 exiting the glycol contactor 102 can be referred to as the dehydrated gas stream 107. In some implementations, the dehydrated gas stream 107 exiting the glycol contactor 102 has no more than 7 pounds per million standard cubic feet (lb/MMSCF) of water content. The rich glycol stream 105 can be flowed to the glycol regeneration system 200, which is configured to fractionate the rich glycol stream 105 in order to remove water 190 (originating from the wet gas stream 101) from the rich glycol stream 105 and regenerate the lean glycol stream 103, such that the lean glycol stream 103 can be recycled to the glycol contactor 102.

Figure 2A:
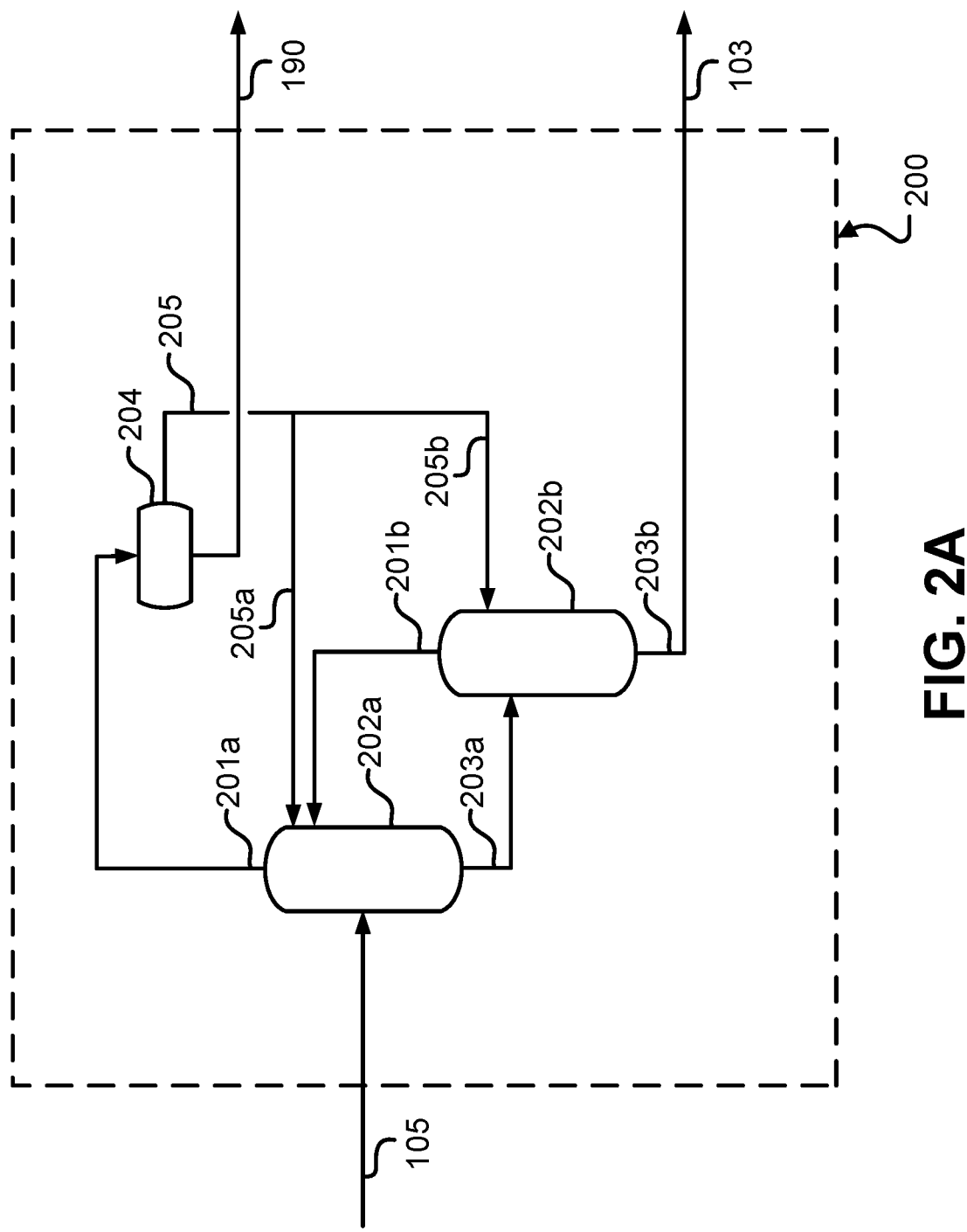
FIGS. 2A & 2B are schematic diagrams of example glycol regeneration systems.

FIG. 2A illustrates an implementation of the glycol regeneration system 200. The glycol regeneration system 200 includes a first stripping column section 202a and a second stripping column section 202b. Each of the first and second stripping column sections (202a and 202b) can receive one or more feed streams, fractionate components of the one or more feed streams, and discharge an overhead stream and a bottoms stream. In some implementations, the first stripping column section 202a includes one or more trays. In some implementations, the first stripping column section 202a includes packing (for example, structured packing, random packing, or both). In some implementations, the first stripping column section 202a includes both trays and packing. In some implementations, the first stripping column section 202a includes at least three trays. In some implementations, the first stripping column section 202a includes at least one foot in height of packing. In some implementations, the second stripping column section 202b includes one or more trays. In some implementations, the second stripping column section 202b includes packing (for example, structured packing, random packing, or both). In some implementations, the second stripping column section 202b includes both trays and packing. In some implementations, the second stripping column section 202b includes at least two trays.

The first stripping column section 202a can receive the rich glycol stream 105 as feed. A solvent can be provided and circulated through the first and second stripping column sections (202a and 202b) to enhance fractionation. The solvent can include a hydrocarbon, such as iso-octane, toluene, and o-xylene. The use of the solvent can improve fractionation of the rich glycol stream 105 into lean glycol (103) and water (190). The solvent can be chosen based on a desired volatility of the solvent when mixed with water. Introducing the solvent to water can reduce its boiling point, which can enhance the separation of the glycol from the water. For example, introducing iso-octane to water can reduce its boiling point (see FIG. 5).

Referring back to FIG. 2A, the first stripping column section 202a can discharge a first overhead stream 201a and a first bottoms stream 203a. The first overhead stream 201a can include the solvent and at least a portion of the water originating from the wet gas stream 101. The first overhead stream 201a can be separated into a solvent stream 205 and a water stream 190. Separating the first overhead stream 201a can include condensing the first overhead stream 201a and separating immiscible liquid phases in a reflux drum 204. The immiscible liquid phases can be gravity separated in a separator 204 to produce the solvent stream 205 (lighter liquid phase) and the water stream 190 (heavier liquid phase). The solvent stream 205 can be divided into a first portion 205a and a second portion 205b. In some implementations, a mass ratio of the first portion 205a to the second portion 205b is in a range of from approximately 1:5 to approximately 1:10. In some implementations, the mass ratio of the first portion 205a to the second portion 205b is 1:9. The first portion 205a of the solvent stream 205 can be recycled to the first stripping column section 202a. In some implementations, the first portion 205a of the solvent stream 205 is recycled to the bottom (or near the bottom) of the first stripping column section 202a. In some implementations, the first portion 205a of the solvent stream 205 is recycled to the bottom-most tray of the first stripping column section 202a.

The second stripping column section 202b can receive the first bottoms stream 203a as feed. The second stripping column section 202b can also receive the second portion 205b of the solvent stream 205. In some implementations, the second portion 205b of the solvent stream 205 is flowed to the top (or near the top) of the second stripping column section 202b. In some implementations, the second portion 205b of the solvent stream 205 is flowed to the top-most tray of the second stripping column section 202b. The second stripping column section 202b can discharge a second overhead stream 201b and a second bottoms stream 203b. The second overheat stream 201b can flow to the first stripping column section 202a. The second bottoms stream 203b is the regenerated (lean) glycol stream 103 which can be recycled to the glycol contactor 102 (shown in FIG. 1). The second bottoms stream 203b can be substantially free of water. The second bottoms stream 203b can be substantially free of the solvent. For example, the second bottoms stream 203b includes less than 0.1 wt. % of iso-octane. For example, the second bottoms stream 203b includes less than 0.085 wt. % of iso-octane.

Although not shown, the glycol regeneration system 200 can also include components typically associated with stripping columns, such as one or more heat exchangers (for example, reboilers and condensers), one or more vessels (for example, reflux drums), one or more pumps, flow control valves, and one or more filters.

Figure 2B:
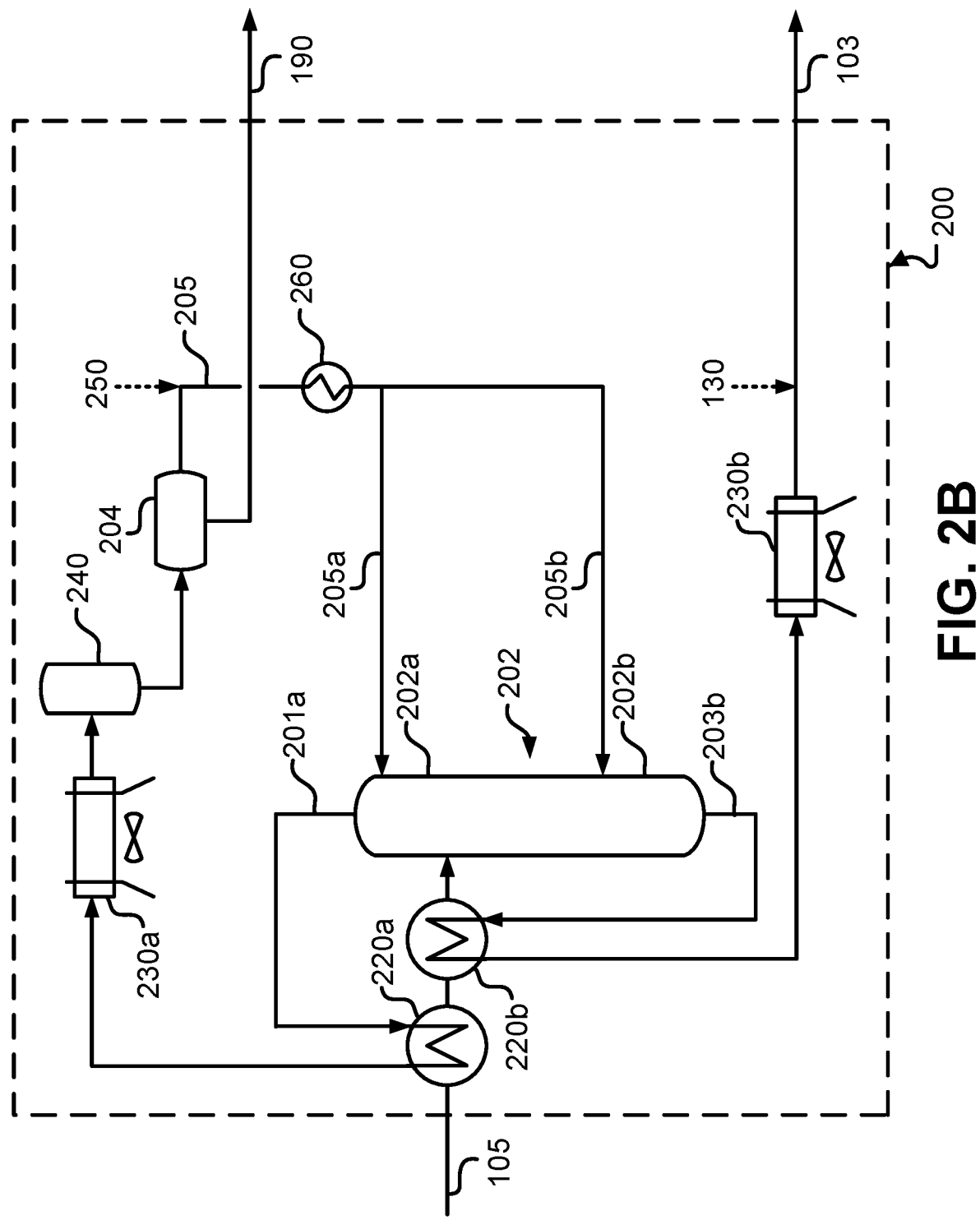

FIG. 2B illustrates another implementation of the glycol regeneration system 200. As shown in FIG. 2B, the first and second stripping column sections (202a and 202b) can be implemented as an integrated stripping column 202. The glycol regeneration system 200 can implement heat integration (that is, exchange of heat between process streams). The rich glycol stream 105 (provided as feed to the first stripping column section 202a) can exchange heat with one or more streams of the glycol regeneration system 200. For example, the rich glycol stream 105 can exchange heat with the first overhead stream 201a and the second bottoms stream 203b before entering the stripping column 202. Heat from the first overhead stream 201a can be transferred to the rich glycol stream 105 in a first feed heater 220a. Heat from the second bottoms stream 203b can be transferred to the rich glycol stream 105 in a second feed heater 220b.

The glycol regeneration system 200 can include a first condenser 230a (for example, an air cooler) that can be used to condense the first overhead stream 201a. The first overhead stream 201a can then flow to a reflux drum 240. As mentioned previously, the first overhead stream 201a can then be gravity separated in separator 204 into the solvent stream 205 and the water stream 190. A makeup solvent stream 250 can be provided to account for solvent loss. The solvent stream 205 can be heated in exchanger 260 before being recycled to the stripping column 202. In some implementations, exchanger 260 is a kettle reboiler that utilizes fuel gas to heat the solvent stream 205.

The glycol regeneration system 200 can include a second condenser 230b (for example, an air cooler) that can be used to cool the second bottoms stream 203b. A makeup glycol stream 130 (for example, a mixture of fresh triethylene glycol and tetraethylene glycol) can be provided to account for glycol loss. The cooled second bottoms stream 203b (which is the regenerated lean glycol stream 103) can then be recycled to the glycol contactor 102 (shown in FIG. 1).

Figure 3A:
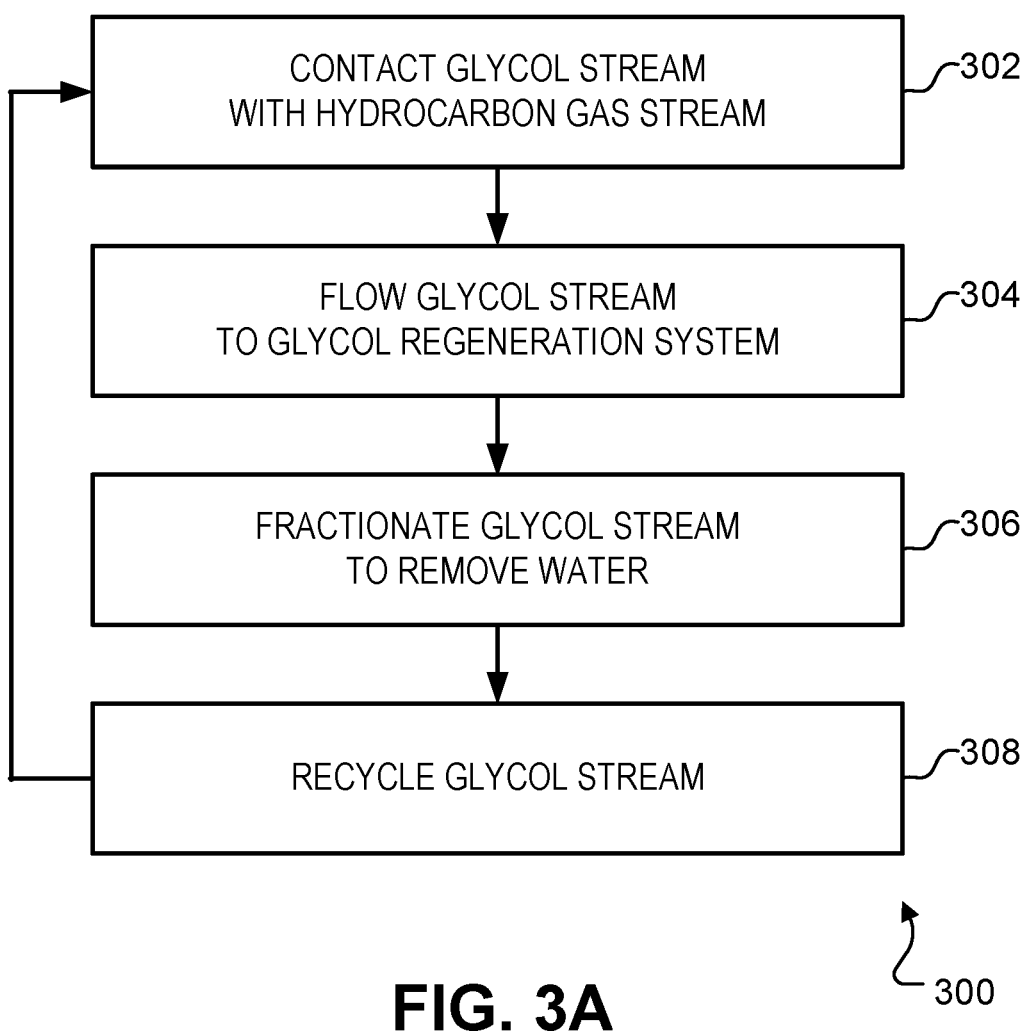
FIG. 3A is a flow chart of an example method that can be implemented to dehydrate gas.

FIG. 3A is a flow chart of an example method 300 that can be implemented to dehydrate gas. The method 300 can be implemented using the gas dehydration system 100. At step 302, a glycol stream (such as the lean glycol stream 103) is contacted with a wet gas stream (such as the wet gas stream 101), for example, using the glycol contactor 102. Contact between the wet gas stream 101 and the glycol stream 103 results in transfer of water from the wet gas stream 101 to the glycol stream 103, thereby forming the rich glycol stream 105. At step 304, the rich glycol stream 105 (including the water originating from the wet gas stream 101) is flowed to a glycol regeneration system (such as the glycol regeneration system 200). At step 306, the rich glycol stream 105 is fractionated to remove water and regenerate the lean glycol stream 103. Step 306 can include sub-steps and is described in more detail later as a method 306 in relation to FIG. 3B. At step 308, the regenerated lean glycol stream 103 is recycled to the glycol contactor 102.

Figure 3B:
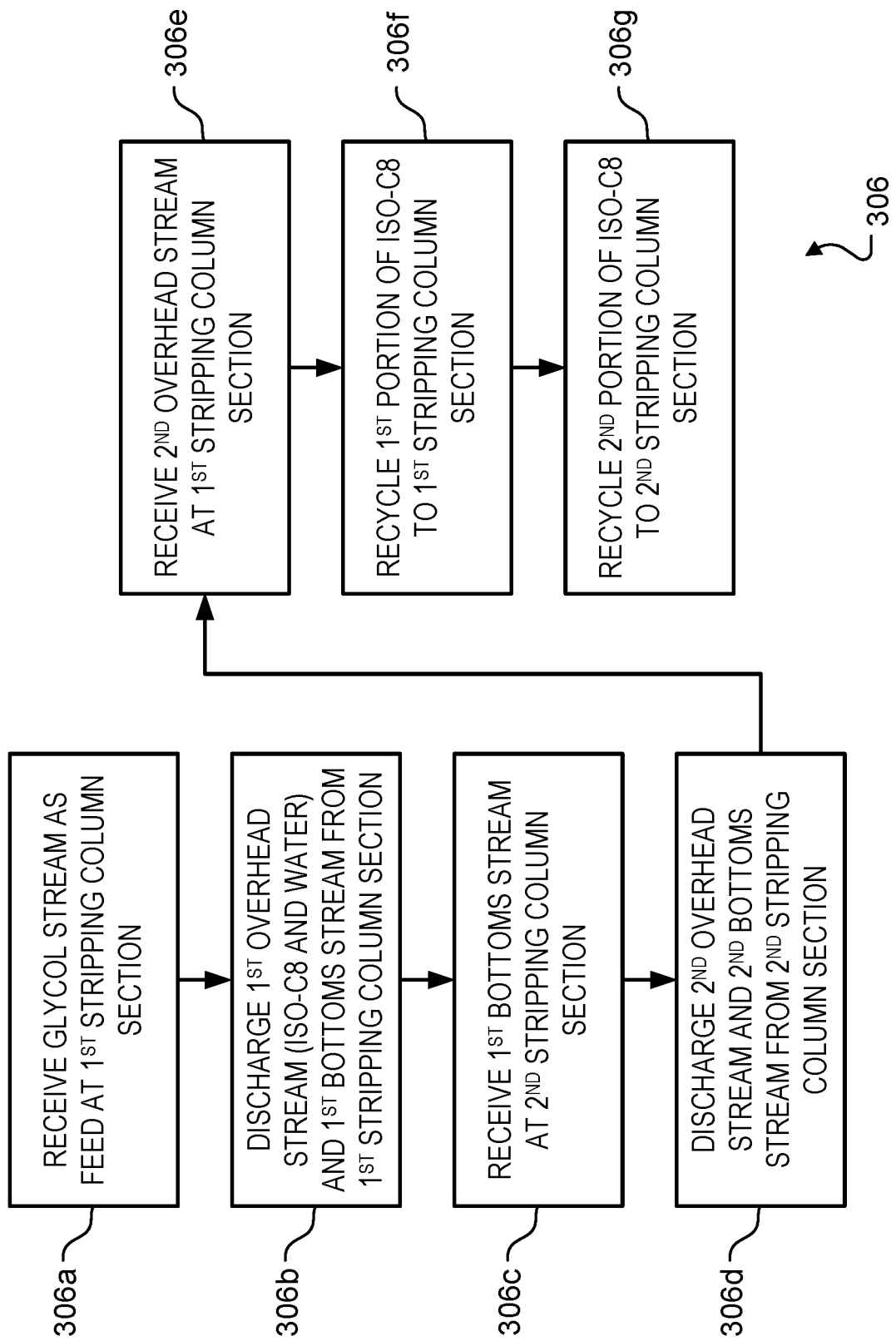
FIG. 3B is a flow chart of an example method that can be implemented to regenerate glycol.

FIG. 3B is a flow chart of an example method 306 that can be implemented to regenerate glycol. Rich glycol (such as the rich glycol stream 105) can be fractionated to regenerate lean glycol (such as the lean glycol stream 103). The method 306 can be implemented using the glycol regeneration system 200. At step 306a, the rich glycol stream 105 is received as feed at a first stripping column section (such as the first stripping column section 202a). At step 306b, a first overhead stream (such as the first overhead stream 201a) and a first bottoms stream (such as the first bottoms stream 203a) is discharged from the first stripping column section 202a. As described previously, the first overhead stream 201a can include a solvent (such as iso-octane) and water (such as the water originating from the wet gas stream 101). At step 306c, the first bottoms stream 203a is received at a second stripping column section (such as the second stripping column section 202b). At step 306d, a second overhead stream (such as the second overhead stream 201b) and a second bottoms stream (such as the second bottoms stream 203b) is discharged from the second stripping column section 202b. At step 306e, the second overhead stream 201b is received at the first stripping column section 202a. At step 306f, a first portion of the solvent (such as the first portion 205a of the solvent stream 205) is recycled to the first stripping column section 202a. At step 306g, a second portion of the solvent (such as the second portion 205b of the solvent stream 205) is recycled to the second stripping column section 202b.

Figure 4:
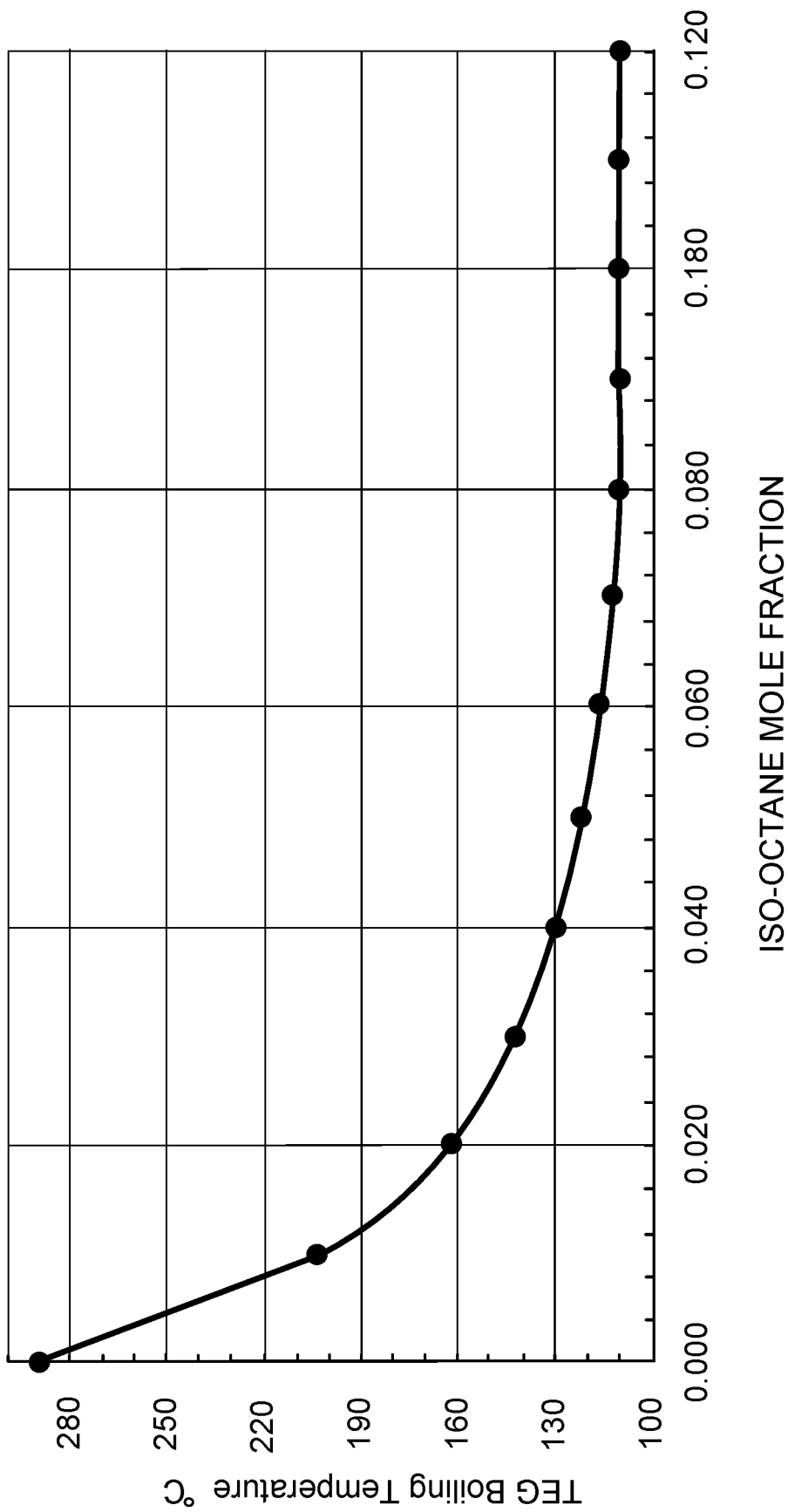
FIG. 4 is a graph showing a relationship between iso-octane concentration and boiling point of glycol.

FIG. 4 is a graph illustrating the effect of iso-octane concentration on the boiling point (in degrees Celsius (° C.)) of a stream including iso-octane and one or more glycols (such as triethylene glycol and tetraethylene glycol). The data shown in FIG. 4 shows the relationship between iso-octane concentration and boiling point of glycol at a pressure of 1 atmosphere (atm). As shown, increasing the iso-octane concentration decreases the boiling point of glycol. Decreasing the boiling point of glycol can reduce heating requirements, which can save both capital costs and operating costs.

Figure 5:
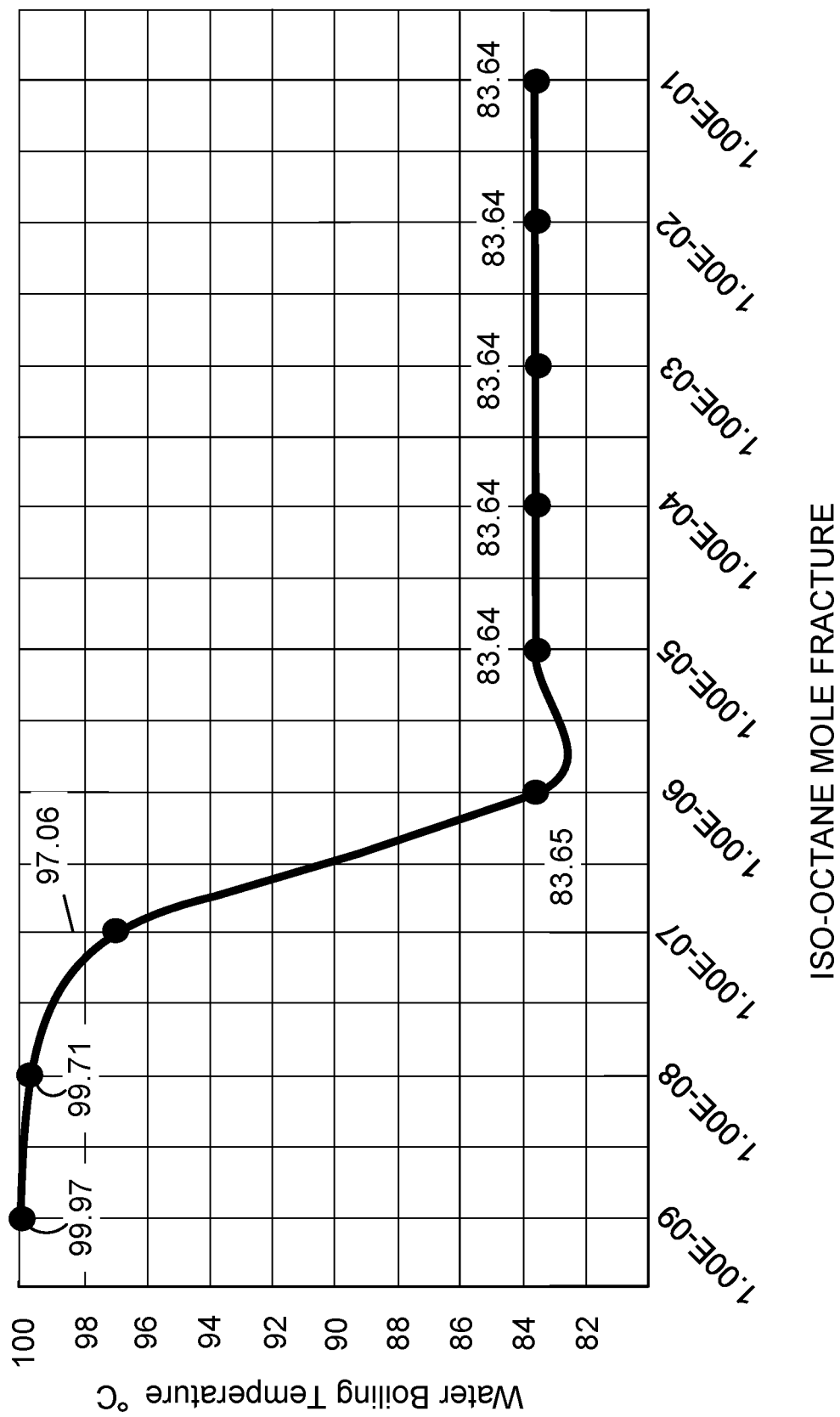
FIG. 5 is a graph showing a relationship between iso-octane concentration and boiling point of water.

FIG. 5 is a graph illustrating the effect of iso-octane concentration on the boiling point (° C.) of a stream including iso-octane and water. The data shown in FIG. 5 shows the relationship between iso-octane concentration and boiling point of water at a pressure of 1 atm. As shown, increasing the iso-octane concentration decreases the boiling point of water. Similarly, decreasing the boiling point of water can reduce heating requirements, which can save both capital costs and operating costs.

Figure 6:
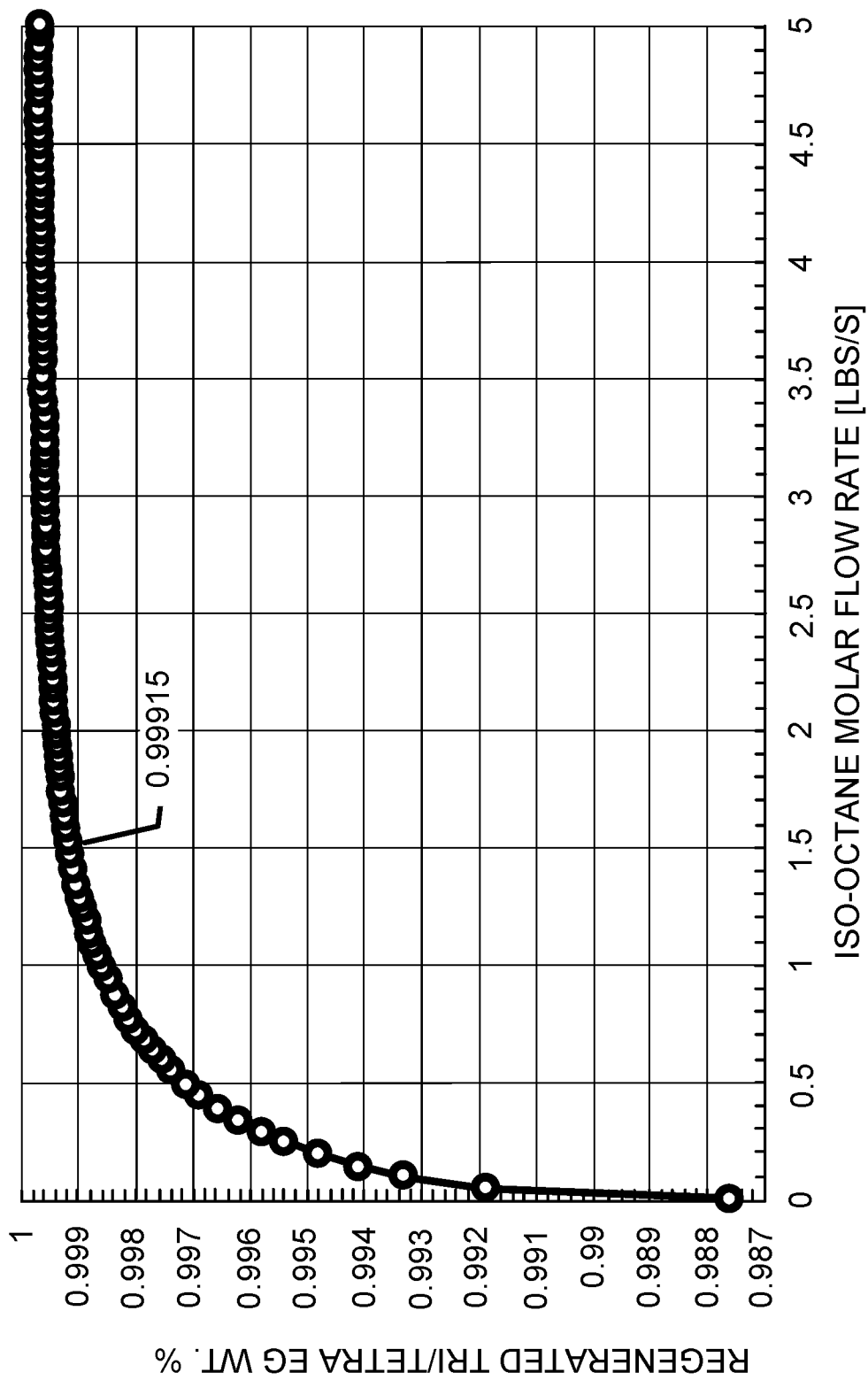
FIG. 6 is a graph showing a relationship between flow of iso-octane and purity of regenerated glycol.

FIG. 6 is a graph showing a relationship between flow of iso-octane (in pounds per second (lb/is)) and purity of regenerated glycol (in wt. %). The flow of iso-octane is the flow of solvent circulated in the stripping column 202 (the first and second stripping column sections 202a and 202b). As shown, increasing the flow of iso-octane can increase the purity of the regenerated glycol (that is, the purity of the second bottoms stream 203b and therefore, the regenerated lean glycol stream 103).

Figure 7:
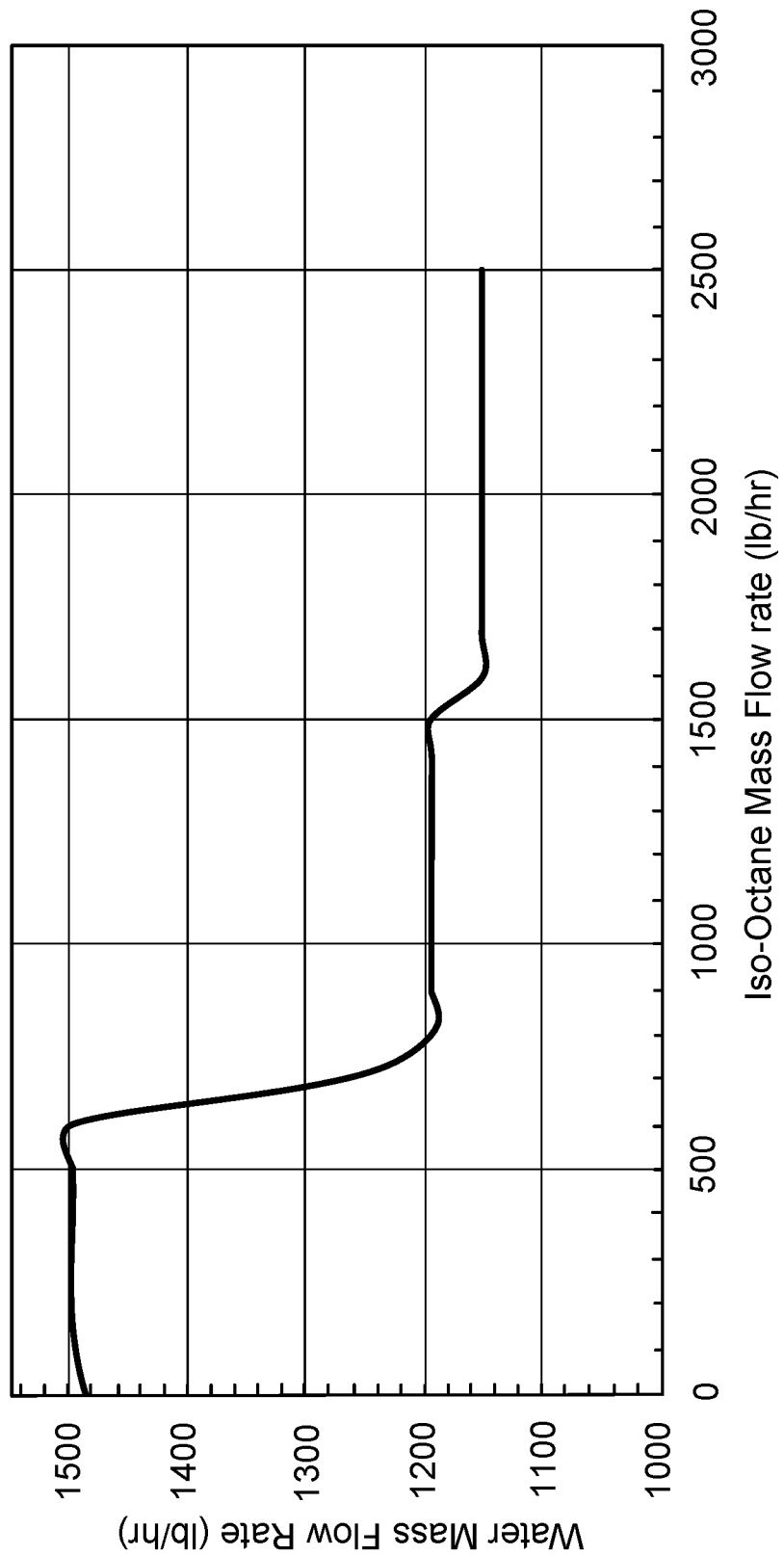
FIG. 7 is a graph showing a relationship between flow of iso-octane and flow of water.

FIG. 7 is a graph showing a relationship between flow of iso-octane (in pounds per hour (lb/hr)) circulating in the stripping column 202 and flow of water (in lb/hr) in the first bottoms stream 203a. As shown, increasing the flow of iso-octane can decrease the amount of water in the first bottoms stream 203a. This relationship is consistent with the relationship illustrated in the graph shown in FIG. 5. Because the presence of iso-octane can decrease the boiling point of water, more water can evaporate, thereby reducing the flow of liquid water exiting the first stripping column section 202a in the first bottoms stream 203a.

Table 1 shows the advantage of using a mixture of glycols in comparison to one type of glycol. Table 1 provides the composition of the dehydrated gas stream 107 for certain implementations in which different glycol solvents are circulated in the glycol regeneration system 200. Solvent A is a mixture of 20 wt. % tetraethylene glycol and 80 wt. % triethylene glycol, while Solvent B is pure triethylene glycol (that is, 100 wt. % triethylene glycol).

TABLE 1

Dehydrated gas stream composition using different glycol solvents

| Component | Solvent A Mass Flow Rate (lb/hr) | Solvent B Mass Flow Rate (lb/hr) |
|---|---|---|
| Water | 360.49 | 360.49 |
| Nitrogen | 11,932.53 | 11,932.53 |
| Carbon dioxide | 33,843.81 | 33,843.81 |
| Hydrogen sulfide | 5,065.47 | 5,065.47 |
| Methane | 705,261.67 | 705,261.67 |
| Ethane | 159,441.43 | 159,441.43 |
| Propane | 122,527.43 | 122,527.43 |
| Iso-butane | 29,560.17 | 29,560.17 |
| Normal-butane | 55,490.67 | 55,490.67 |
| Iso-pentane | 19,045.21 | 19,045.21 |
| Normal-pentane | 19,565.37 | 19,565.37 |
| Normal-hexane | 15,886.38 | 15,886.38 |
| Normal-heptane | 8,346.59 | 8,346.59 |
| Normal-octane | 4,310.32 | 4,310.32 |
| Normal-decane | 769.25 | 769.25 |
| Normal-nonane | 1,833.96 | 1,833.96 |
| Normal-undecane | 302.63 | 302.63 |
| Normal-dodecane | 0.000 | 0.000 |
| Triethylene glycol | 0.000 | 23.68 |
| 2,2,3-Trimethylpentane | 0.000 | 0.000 |
| Tetraethylene glycol | 0.009 | 0.000 |

As shown in Table 1, the use of a mixture of triethylene glycol and tetraethylene glycol as the solvent (205) reduces the amount of solvent lost to the dehydrated gas stream 107 in comparison to the use of pure triethylene glycol.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Likewise, "about" and "substantially" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the subranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A gas dehydration system comprising:
   a wet gas stream comprising water;
   a glycol stream comprising a mixture of triethylene glycol and tetraethylene glycol;
   a glycol contactor configured to receive the wet gas stream and the glycol stream, the glycol contactor configured to dehydrate the wet gas stream by contacting the wet gas stream with the glycol stream, wherein the glycol stream exiting the glycol contactor comprises at least a portion of the water from the wet gas stream; and
   a glycol regeneration system configured to remove the portion of the water from the glycol stream such that the glycol stream can be recycled to the glycol contactor, the glycol regeneration system comprising:
      a first stripping column section configured to receive as feed the glycol stream comprising water, the first stripping column section configured to fractionate the glycol stream comprising water;
      a first overhead stream from the first tripping column section, the first overhead stream comprising iso-octane;
      a first bottoms stream from the first stripping column section;
      a second stripping column section configured to receive as feed the first bottoms stream, the second stripping column section configured to fractionate the first bottoms stream;
      a second overhead stream from the second stripping column; and
      a second bottoms stream from the second stripping column, the second bottoms stream comprising the glycol stream free of the portion of the water,
      wherein the first stripping column section is configured to receive the second overhead stream and a first portion of the iso-octane of the first overhead stream,
      wherein the second stripping column section is configured to receive a second portion of the iso-octane of the first overhead stream.

2. The system of claim 1, wherein the mixture of triethylene glycol and tetraethylene glycol comprises from approximately 10 weight percent (wt. %) to approximately 30 wt. % of tetraethylene glycol.

3. The system of claim 2, wherein the mixture of triethylene glycol and tetraethylene glycol comprises approximately 20 wt. % of tetraethylene glycol.

4. The system of claim 1, wherein the second bottoms stream comprises less than 0.1 wt. % of iso-octane.

* * * * *